(12) United States Patent
Müller et al.

(10) Patent No.: US 9,365,154 B2
(45) Date of Patent: Jun. 14, 2016

(54) METHOD FOR ACTUATING A BRAKE LIGHT OF A HYDRAULIC DRIVEN WORKING MACHINE

(75) Inventors: Daniel Müller, Newel (DE); Thomas Schaefer, Trier (DE); Bernd Faber, Konz (DE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 14/375,085

(22) PCT Filed: Feb. 2, 2012

(86) PCT No.: PCT/SE2012/000011
§ 371 (c)(1),
(2), (4) Date: Jul. 30, 2014

(87) PCT Pub. No.: WO2013/115686
PCT Pub. Date: Aug. 8, 2013

(65) Prior Publication Data
US 2015/0009026 A1    Jan. 8, 2015

(51) Int. Cl.
*B60Q 1/50* (2006.01)
*B60Q 1/44* (2006.01)

(52) U.S. Cl.
CPC *B60Q 1/441* (2013.01); *B60Q 1/44* (2013.01); *B60Q 1/444* (2013.01)

(58) Field of Classification Search
CPC ........ B60Q 1/441; B60Q 1/44; B60Q 1/2603; B60Q 1/444; B60Q 1/447; B60T 17/22; H05B 33/0845; H05B 33/0803
USPC ......... 340/479, 467, 463, 464, 468, 471, 472, 340/425.5, 686.1, 679; 307/10.1, 10.8, 9.1
See application file for complete search history.

(56) References Cited

U.S. PATENT DOCUMENTS

| 3,827,522 | A | 8/1974 | Krause |
| 5,387,898 | A | 2/1995 | Yeheskel et al. |
| 5,426,418 | A | 6/1995 | Furgeson et al. |
| 5,852,399 | A | 12/1998 | Pettijohn |
| 6,525,652 | B2 * | 2/2003 | Smith ............... B60Q 1/44 340/425.5 |
| 6,628,197 | B1 * | 9/2003 | Poguntke ............ B60Q 1/44 340/463 |
| 2003/0043033 | A1 | 3/2003 | Lee |

(Continued)

FOREIGN PATENT DOCUMENTS

| DE | 3233765 A1 | 3/1984 |
| FR | 2690396 A1 | 10/1993 |

(Continued)

OTHER PUBLICATIONS

International Search Report (Nov. 2, 2012) for for corresponding International Application PCT/SE2012/000011.

(Continued)

*Primary Examiner* — Anh V La
(74) *Attorney, Agent, or Firm* — WRB-IP LLP

(57) ABSTRACT

A method is provided for actuating a brake light of a hydraulic driven working machine that includes equipment to detect the condition of travel including a travel speed sensor, a gear selector switch, a travel direction switch and a travel pedal pressure sensor. The equipment automatically activates a brake light via a control circuit depending on the selected gear if the machine decelerates without the brake pedal being pushed.

12 Claims, 2 Drawing Sheets

(56) References Cited

U.S. PATENT DOCUMENTS

2006/0125617 A1 6/2006 Zimmermann
2012/0185130 A1* 7/2012 Ekchian .............. B60Q 1/2603
701/36

FOREIGN PATENT DOCUMENTS

| | | | |
|---|---|---|---|
| GB | 2229002 | A | 9/1990 |
| GB | 2380250 | A | 4/2003 |
| JP | 2010143332 | A | 7/2010 |
| WO | 0014697 | A1 | 3/2000 |

OTHER PUBLICATIONS

Patent Abstracts of Japan JP 01-262231 (Oct. 19, 1989) Hitachi Constr. Mach. Co. Ltd. (translation).

Patent Abstracts of Japan JP 01-111550 (1989-0428) Hitachi Constr. Mach. Co Ltd. (translation).

Patent Abstracts of Japan JP 61-212772 (Sep. 20, 1986)Kitasu. (translation).

European Search Report (Oct. 14, 2015) for corresponding European App. EP 12 86 7487.

\* cited by examiner

METHOD FOR ACTUATING A BRAKE LIGHT OF A HYDRAULIC DRIVEN WORKING MACHINE

BACKGROUND AND SUMMARY

A working machine typically has a service brake to decelerate the machine. A brake light illuminates whenever the machine is braked to warn others.

The risks of that system are based on the fact that the one or more brake lights are only turned on when the brake pedal for the service brake is pushed. But very often the operator is not using the service brake, because hydraulically powered working machines can be braked hydraulically without using the service brake. This could be dangerous for someone driving behind if the brake lights are not turned on. To actuate the brake lights without actuating the service brake the following solutions are known in the prior art.

The solution of U.S. Pat. No. 3,827,522 and JP 1262231 A is based on detecting a pressure in the hydraulic system of a hydraulically propelled vehicle, wherein the detected hydraulic pressure is indicative of deceleration. Whenever the pressure exceeds a predetermined level corresponding to a braking or deceleration of the machine the brake lights are illuminated.

JP 111 1550A and JP 61212772A describe solutions of turning on brake lights based on the degree of machine deceleration. When the deceleration exceeds a predetermined value the brake lights are turned on.

U.S. Pat. No. 5,387,898 and US 2006/0125617 disclose systems for actuating brake lights based on a detection of an accelerator pedal motion and/or pedal position.

It is difficult and costly to incorporate brake light systems that detect hydrostatic deceleration and illuminate the brake lights even though the service brake is not activated.

It is therefore desirable to provide an improved method for actuating brake lights of a working machine.

According to an aspect of the present invention, in a method, the brake lights are turned on if the service brake is activated or if the service brake is not activated and a few monitored parameters fulfill predetermined criteria dependent on a selected machine gear.

Advantages of the invention can be gathered from the following, description and the dependent claims.

BRIEF DESCRIPTION OF THE DRAWINGS

The invention will be explained in more detail below by using the exemplary embodiment illustrated in the appended drawings, in which.

DETAILED DESCRIPTION

The invention can be applied in a hydraulic transmission system of a working machine 100. The invention is particularly useful for an open loop hydraulic system.

Figure 1:
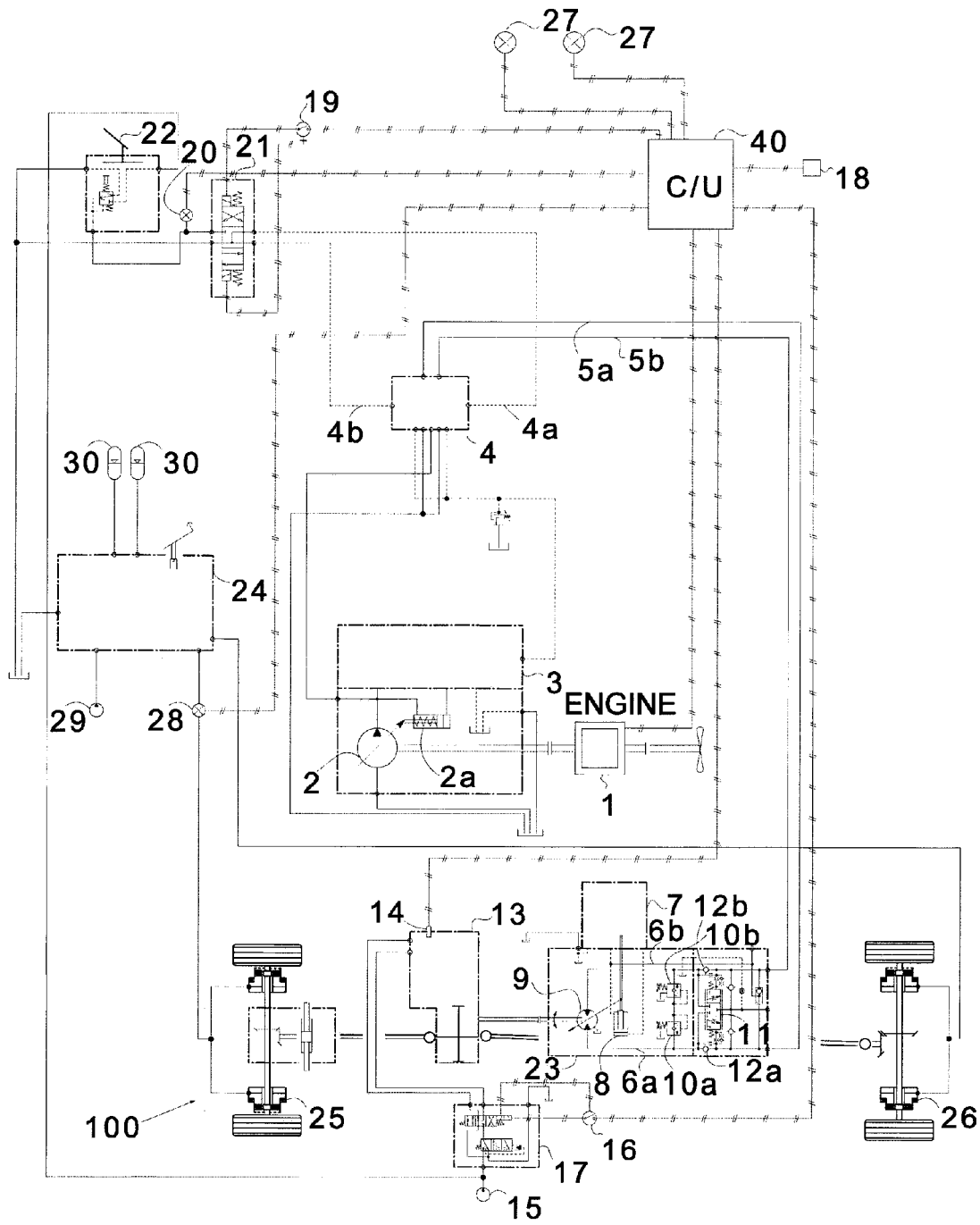
FIG. 1 shows, schematically, a hydraulic circuit of a working machine according to the invention.

The system according to FIG. 1 comprises a prime mover that is a diesel engine 1 which is driving a hydraulic pump 2. This hydraulic pump 2 is generating a hydraulic flow to a main control valve 4. If the operator of the machine wants to travel he has to operate a travel pedal 22 to generate a hydraulic pressure. This pressure is going to a travel direction valve 21. With this travel direction valve 21 a travel direction of the machine either forward or backward is selected. The travel direction is selected by the operator with a travel direction switch 19.

The travel direction valve 21 sends the hydraulic pressure generated by the travel pedal 22 either to a travel pilot line 4a or 4b depending on the selected travel direction. This pressure is moving the travel control spool in the main control valve 4 in the selected direction.

The hydraulic flow generated by the hydraulic pump 2 is sent over work lines 5a or 5b to a travel device 23. At the same time the load pressure of the travel device 23 is sent over a load sensing line to a pump controller 3 and a swivel angle control spool 2a is moved from 0 to the maximum swivel angle position.

In the travel device 23 the oil is going over check valves 12a or 12b to a travel motor 9 and the travel motor 9 is starting to turn. The travel motor 9 is connected to a travel gear box 13 and the travel gear box 13 is driving the wheels of the machine over two propel shafts and two axles. The returning oil from the travel motor 9 is going over the brake valve 11 and the work lines 5a and 5b to the travel control valve and from there to the tank. The travel device 23 preferably comprises a travel motor 9 with a variable displacement and a travel motor displacement control valve 7 connected to a travel motor displacement control spool 8. A pilot gear pump 15 is connected via a gear shift valve 17 to the travel gear box 13. A gear selector switch 16 is operationally connected with the gear shift valve 17.

The spool of the brake valve 11 is as long in neutral position as the pressure in the work lines 5a and 5b is almost the same. If the pressure in one of the two lines is rising because the main valve 4 is sending oil to the travel device 23 the spool of the brake valve 11 is moving and opens a connection to the work lines 5a and 5b so that the returning oil from the travel motor 9 can return to the main control valve 4. In the neutral position all ports of the brake valve 11 are closed.

Now, when the operator is decelerating the machine by reducing the stroke of the travel pedal 22 the supply pressure to the travel device 23 is collapsing and the spool of the brake valve 11 is moving to the neutral position. Due to this the travel motor 9 is primping the oil against the closed spool of the brake valve 11 and the oil is moving in a small circuit between the travel motor 9 and the brake valve 11 over pressure lines 6a and 6b until pressure relief valves 10a or 10b are opening. This results in a hydrostatic caused deceleration of the machine. This deceleration is realized without using a service brake of the machine.

If the operator is using the service brake by pushing a brake pedal 24 the pressure generated by a brake pump 29 and stored in the accumulators 30 is sent to a service brake front 25 and a service brake rear 26. From a brake pressure sensor 28 a control unit 40 gets the information that the service brake is activated by pushing the brake pedal 24 and turning on brake lights 27.

Input signals of the control unit 40 are further provided via signal lines by a travel speed sensor 14, a travel/work selector switch 18, a travel direction switch 19, a travel pedal pressure sensor 20 and the gear selector switch 16.

The output signals of the control unit 40 are signals transmitted over the signal lines to at least the engine 1 and the brake lights 27.

According to the invention the brake lights 27 are also turned on if the service brake pedal 24 is not pushed due to an automatic brake light activation under certain circumstances as described below. At least one brake light 27 is also sufficient.

A method for actuating a brake light of a hydraulic driven working machine comprises an equipment to detect the condition of travel including a travel speed sensor 14, a gear selector switch 16, a travel/work, selector switch 18, a travel direction switch 19 and a travel pedal pressure sensor 20. In a travel mode or a working mode of the working machine the equipment automatically activates a brake light 27 via a control circuit 40 depending on the selected gear if the machine decelerates without pushing the brake pedal 24.

The brake light 27 can further be turned on via the pushing of the brake pedal 24 being detected by a brake pressure sensor 28.

Depending on the selection between at least three different gears the equipment can automatically activate the brake light 27 via the control circuit 40 if a gear greater 1 is selected and the travel direction switch 19 is changed. Depending on the selection between at least three different gears the equipment can automatically activate the brake light 27 via the control circuit 40 if a gear greater 1 is selected and the travel pedal pressure sensor 20 detects a release of the travel pedal 22. As a further criteria the travel speed detected by the travel speed sensor 14 should exceed 5 km/h.

Depending on the selection between at least three different gears the equipment cart automatically activate the brake light 27 via the control circuit 40 if a gear greater 1 is selected and the travel pedal pressure sensor 20 detects a release of the travel pedal 22 above a predetermined value. As a further criteria the travel speed detected by the speed sensor 14 should exceed 15 km/h.

Depending on the selection between at least three different gears the equipment automatically activates the brake light 27 via the control circuit 40 if a third gear is selected and a malfunction of the equipment is detected. The travel speed detected by the speed sensor 14 should then exceed 15 km/h.

A basic criteria is that the machine has at least three gears, typically named snail, turtle and rabbit. Embodiments for the automatic brake light activation are as follows:

In the slowest gear, a first snail gear, the machine reaches only a low speed of for example approximately 2 to 5 km/h. In this gear there is no function for an automatic brake light activation independent from the pushing of a brake pedal since the machine is standing still immediately.

In a medium fast gear, a second turtle gear, the machine reaches a medium speed of for example approximately 5 to 10 km/h. Thus, the deceleration can reach a value where it is useful to activate an automatic brake light if there is an abrupt travel change such as a reversing of the travel direction by tripping the travel direction switch 19 or a stopping of the machine by lifting the foot fully from the travel pedal 22. There is no function of the automatic brake light activation if the operator just decelerates the machine by reducing the stroke of the travel pedal.

In a fast gear, a third rabbit gear, the machine reaches dependent on the speed version of the machine a speed exceeding at least 10 km/h, in particular 20, 25 or 35 km/h. Thus, the deceleration can reach a value where it is useful to activate an automatic brake light if there is an abrupt travel change such as a reversing of the travel direction by tripping the travel direction switch 19 or a stopping of the machine by lifting the foot fully from the travel pedal 22. In addition, the automatic brake light activation is applied if the operator decelerates the machine by reducing the stroke of the travel pedal above a defined value.

Figure 2:
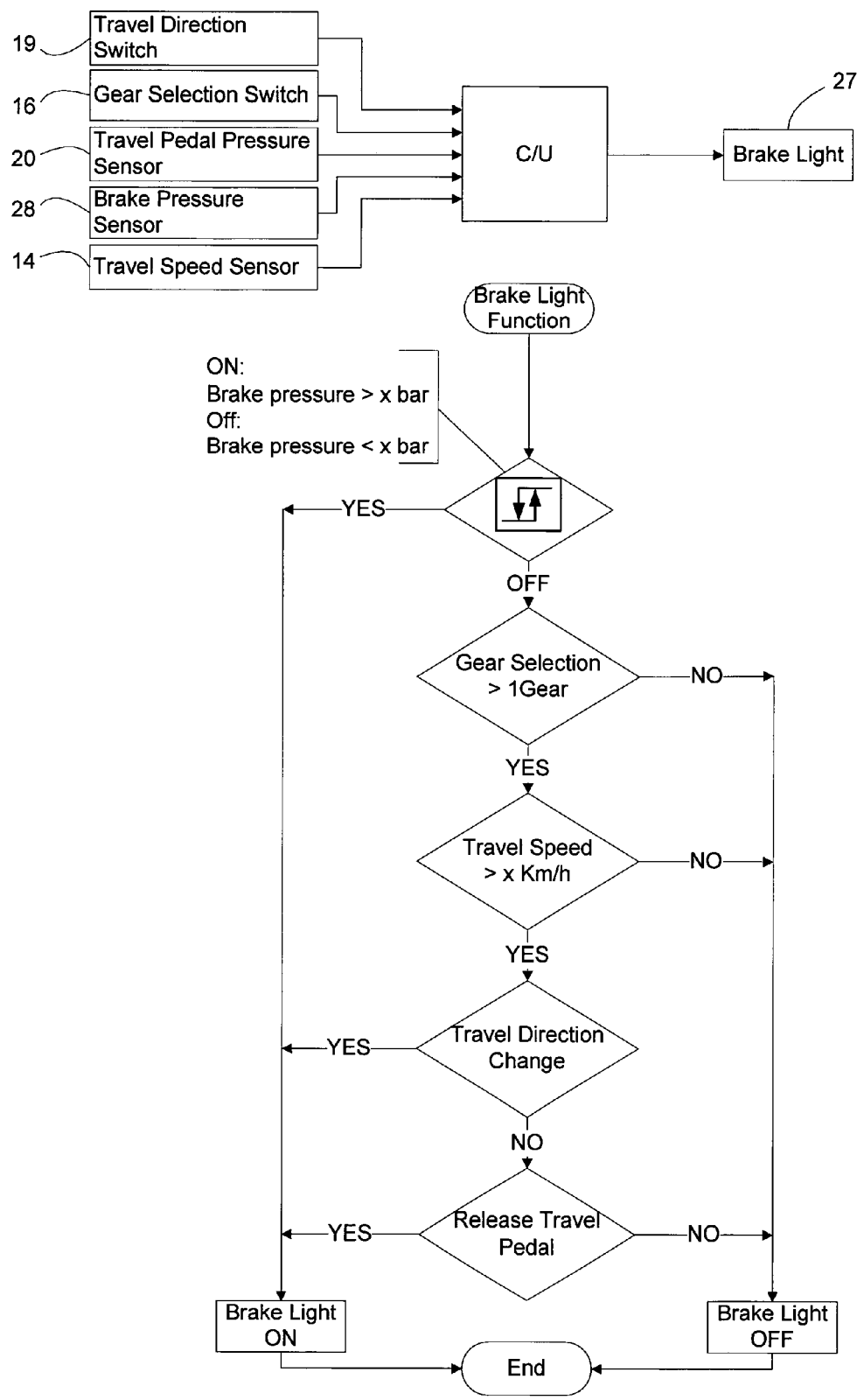
FIG. 2 shows, schematically, a block diagram of an automatic brake light actuation.

As shown in FIG. 2 the function of the automatic brake light activation is controlled by an equipment that detects the condition of travel as follows: The brake pedal pressure is detected by the brake pressure sensor 28. The travel speed is detected by the travel speed sensor 14. The gear is detected by the gear selector switch 16. The reversing of the travel direction is detected by the travel direction switch 19. The stopping of the machine is detected by the travel pedal pressure sensor 20. If this value is decreasing from a value X to 0 bar it is recognized as a stopping. The deceleration of the machine is detected by the travel pedal pressure sensor 20. If the gradient of decrease of this pressure is above a certain value it is regarded as a deceleration high enough to turn on the brake lights.

The brake lights 27 can also be turned on if there is a malfunction of a sensor or any other component which is leading to a deceleration that is fulfilling the above mentioned criteria. Another feature is flashing brake lights 27 in an especially dangerous situation. There are two situations that are considered to be very dangerous. An emergency braking of the service brake pedal 24 with a deceleration that is above a certain value. The deceleration can be calculated from the machine speed which is detected by the travel speed sensor 14. Secondly, if a control lockout lever (not shown) of the machine is put down. In both cases the machine should be in the third gear and the machine should run above a certain speed.

The invention claimed is:

1. A method for actuating a brake light of a hydraulic driven working machine, the machine comprising equipment to detect a condition of travel including a travel speed sensor, a gear selector switch, a travel direction switch and a travel pedal pressure sensor, comprising automatically activating, via the equipment, the brake light via a control circuit depending on a selected gear if the machine decelerates without a brake pedal being pushed, wherein depending on a selection between at least three different gears the equipment automatically activates the brake light via the control circuit if a gear greater than a lowest gear of the machine is selected and the travel direction switch is changed.

2. A method according claim 1, wherein the brake light is further turned on via pushing of the brake pedal being detected by a brake pressure sensor.

3. A method according to claim 1, wherein as a further criteria the travel speed detected by the travel speed sensor exceeds 5 km/h.

4. A method according to claim 1, wherein depending on the selection between at least three different gears the equipment automatically activates the brake light via the control circuit if a gear greater than a lowest gear of the machine is selected and the travel pedal pressure sensor detects a release of the travel pedal above a predetermined value.

5. A method according to claim 4, wherein as a further criteria the navel speed detected by the speed sensor exceeds 15 km/h.

6. A method according to claim 1, wherein depending on the selection between at least three different gears the equipment automatically activates the brake light via the control circuit if a third gear is selected, the travel speed detected by the speed sensor exceeds 15 km/h and a malfunction of the equipment is detected.

7. A method for actuating a brake light of a hydraulic driven working machine, the machine comprising equipment to detect a condition of travel including a travel speed sensor, a gear selector switch, a travel direction switch and a travel pedal pressure sensor, comprising automatically activating, via the equipment, the brake light via a control circuit depending on a selected gear if the machine decelerates without a brake pedal being pushed, wherein depending on a selection between at least three different gears the equipment automatically activates the brake light via the control circuit if a gear greater than a lowest gear of the machine is selected and the travel pedal pressure sensor detects a release of the travel pedal.

8. A method according claim 7, wherein the brake light is further turned on via pushing of the brake pedal being detected by a brake pressure sensor.

9. A method according to claim 7, wherein as a further criteria the travel speed detected by the travel speed sensor exceeds 5 km/h.

10. A method according to claim 7, wherein depending on the selection between at least three different gears the equipment automatically activates the brake light via the control circuit if a gear greater than a lowest gear of the machine is selected and the travel pedal pressure sensor detects a release of the travel pedal above a predetermined value.

11. A method according to claim 10, wherein as a further criteria the travel speed detected by the speed sensor exceeds 15 km/h.

12. A method according to claim 7, wherein depending on the selection between at least three different gears the equipment automatically activates the brake light via the control circuit if a third gear is selected, the travel speed detected by the speed sensor exceeds 15 km/h and a malfunction of the equipment is detected.

* * * * *